United States Patent [19]
Simons

[11] 3,715,044
[45] Feb. 6, 1973

[54] ROOF MOUNTED CARRIED FOR AUTOMOTIVE VEHICLES

[76] Inventor: Gary A. Simons, 2980 S. 149th St., New Berlin, Wis. 53151

[22] Filed: Oct. 7, 1970

[21] Appl. No.: 78,833

[52] U.S. Cl. ..........................214/450, 224/42.1 E
[51] Int. Cl. ...............................................B60r 9/00
[58] Field of Search ..................214/450; 224/42.1 E

[56] References Cited

UNITED STATES PATENTS

| | | | |
|---|---|---|---|
| 3,008,784 | 11/1961 | Allard | 224/42.1 E |
| 1,804,868 | 5/1931 | Gage | 224/42.1 E |
| 3,580,439 | 5/1971 | Jewett | 224/42.1 E |
| 3,113,819 | 12/1963 | Bessette | 224/42.1 E |
| 3,112,041 | 11/1963 | Havens | 214/450 |
| 2,109,571 | 3/1938 | Le Boeuf | 224/42.1 E |

*Primary Examiner*—Albert J. Makay
*Assistant Examiner*—John Mannix
*Attorney*—Alter, Weiss & Whitesel

[57] ABSTRACT

A rooftop carrier for an automotive vehicle includes a tray which slides out in a horizontal position and then swings down into a vertical position over the side of the auto. A front panel on the tray swings down to provide a table or counter for receiving a camp stove or forming a picnic table. Other compartments in the carrier receive suitable camp gear such as sleeping bags, cots and lamps.

5 Claims, 6 Drawing Figures

PATENTED FEB 6 1973 3,715,044
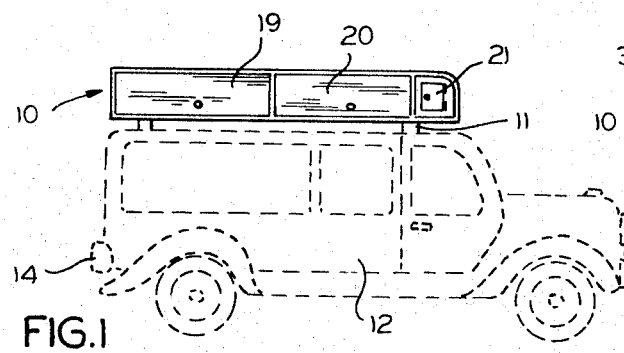
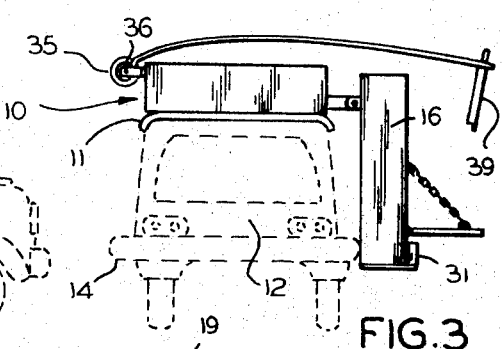
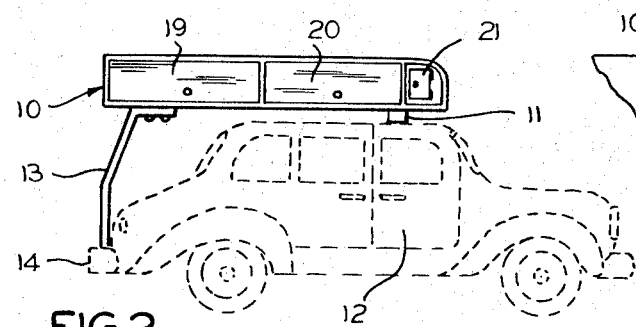
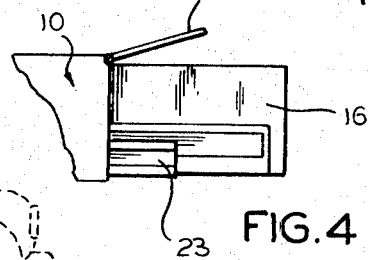
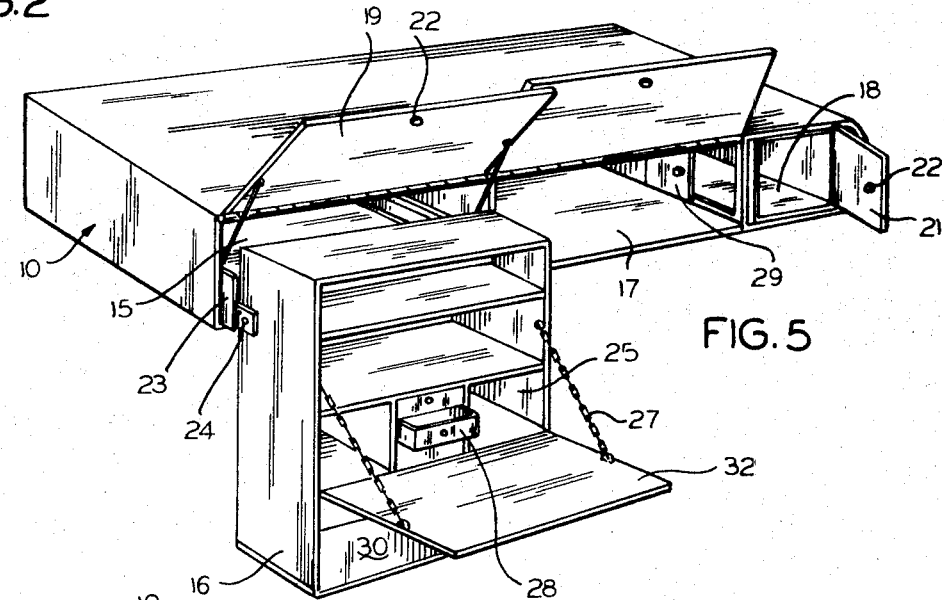
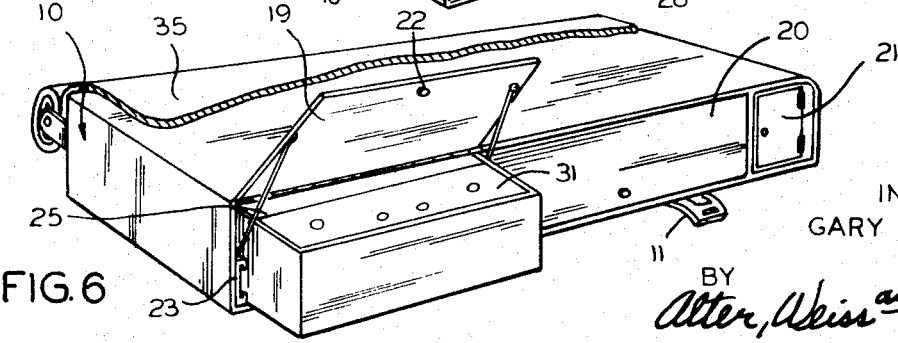
INVENTOR
GARY A. SIMONS
BY Alter, Weiss and Whitesel
ATTORNEYS

ROOF MOUNTED CARRIED FOR AUTOMOTIVE VEHICLES

My invention relates to rooftop carriers for vehicles, and more particularly to camping carriers that may be placed upon the roof of an automotive vehicle.

Campers have generally had shipping options, which involve the use of an auto trunk, rooftop carriers, or trailers. Usually the trunk or rooftop carrier options offer nothing more than large boxes which have to be unpacked whevever it is necessary to find something. They contribute nothing to organization of equipment and supplies since the camp gear must still be packed into an unassorted heap in the trunk or carrier. Trailers do offer the opportunity for organization of the camping equipment; however, they are expensive, place a strain on the auto, limit speed, and sometimes cause road hazards.

Accordingly, an object of my invention is to provide a device that acts as an organized storage compartment and table, and that may be easily applied to or removed from the roof of the vehicle.

Still another object of my invention is to provide a device of the described character that is designed for the transportation of luggage, supplies, and camping equipment. Here, an object is to organize camping equipment so that it is available without requiring a substantial amount of packing or unpacking.

A further object of my invention is to provide a device that permits easy access to the contents disposed therein.

Still a further object is to provide a device which is designed to be mounted on either a station wagon or conventional automobile, and which may be attached in a convenient and efficient manner.

Other and further objects of my invention will become more apparent as the description proceeds, when taken in conjunction with the drawings, in which:

FIG. 1 is a side elevation view which shows the rooftop carrier, constituting my invention, disposed on top of a conventional station wagon;

FIG. 2 is a similar view of the same device mounted on the top of a conventional automobile;

FIG. 3 is a rear elevation view of the rooftop carrier device in an open position on a station wagon;

FIG. 4 is a fragmentary view of the carrier with the drawer unit partially extending therefrom;

FIG. 5 is a perspective view of the entire unit in an open position, and

FIG. 6 is a perspective view of the drawer portion partially extending outward from the unit.

Similar reference characters identify corresponding parts and features throughout the several views. More particularly, the character 10 generally identifies the body of a rooftop carrier device equipped with means 11 for attaching it to the top or roof of the automotive vehicle. Obviosuly, construction of the attaching means may vary depending upon the need for supporting the body 10 on the roof of the vehicle. For example, if the vehicle is a conventional automobile as shown in FIG. 2, the rearward end of the carrier 10 may be supported in any other efficient manner, as by a standard, shown as 13, resting onto the bumper 14 of the vehicle.

The carrier body 10 is here shown as being divided into three separate storage compartments. A compartment 15 slidably supports a drawer and cabinet section 16. A compartment 17 stores general camping gear, such as a tent, blankets, bedding, or the like. A forward compartment 18 may store a refrigerator unit, or the like. Although I have shown and described three compartments, it should be understood that the body 10 may be divided into any suitable number of compartments accessible from either one side or both sides of the unit. Each of the three compartments 15, 17 and 18 may be equipped with hinged doors 19, 20 and 21 respectively. Or, the drawer and cabinet 16 may have a front panel which eliminates the need for a separate door. Any or all of the doors or drawers may be equipped with locks, as shown by the reference character 22.

If desired, the door 21 may be eliminated in favor of sliding doors 29 between the compartments 17 and 18. Also, any of the compartments or drawers may be further divided to accommodate miscellaneous items (not shown), such as a camp lantern, tent heater, cooking utinsels, and other equipment, as required.

By referring to FIG. 5, it will be noted that the drawer and cabinet section 16 is slidably mounted on rails generally shown at 23. A hinge-supported arrangement permits the section 16 to move outwardly in a horizontal position and then swing downwardly to be suspended in a vertical position. The slidable support rails 23 may be of any conventional design. If desired, the shelf section 16 may be equipped with a compartment 30 for receiving an often sought item such as a camp stove 31. A large door 32 may swing down to form a table or work surface.

The drawer and cabinet section 16 (see FIG. 5) is divided into a plurality of shelves, or sections 25, and drawers 28, arranged in any convenient manner. Thus, the camping equipment may be packed away in an orgainzed manner so that it always is readily available. The hinge-supported table member 32 may be held in a horizontal position by means of cords or chains shown as 27. When the unit 16 is vertically disposed in its open position, the table member 32 may be employed as a support for the camp stove 31, other cooking means, or dishes (not shown).

The compartment 15 accommodates the drawer and cabinet section 16 when it is put away. First, equipment is packed into the plurality of compartments, shelves, or drawers 28, and the table 32 is folded flat over the surface of the shelves 25 and perhaps latched in position to form a completely closed unit. Then the drawer 16 is raised to a horizontal position and slidably moved into the compartment 15. The compartments 17 and 18 are packed full of bedding, knapsacks, a tent, or any other accessory used by the camper.

Finally, a conventional canvas tarpaulin or cover 35 is spread over the top and secured in position. If desired, a spring actuated roller (see FIGS. 3 and 6) may be used to roll up the tarpaulin when not in use. Also, the canvas attached to the unit may serve as a tent or protection when supported at its end by any conventional tent poles 39.

From the above description, it will become apparent that the device performs an important and useful function. It may be constructed of wood, aluminum, plastic, steel, fiber glass, or the like.

Other and further modifications may readily occur to those who are skilled in the art. Therefore, the appended claims are to be construed to cover all equivalent structures which may fall within the spirit and the scope of the invention.

I claim:

1. A rooftop carrier for an automobile, said carrier comprising a body portion having means for attaching said body to an automobile, a drawer unit which slides horizontally into said body unit, hinge means enabling said drawer to swing down to a vertical position after it is fully extended from said body, means comprising a weatherproof material for covering the top of said carrier, and means removed from said automobile for supporting said weatherproof material to provide a tent-like protection for said drawer, when in a vertical position.

2. The carrier of claim 1 and spring loaded roller means for rolling up said weatherproof material when not in use.

3. The carrier of claim 1 wherein there are a plurality of compartments in said body adjacent said drawer and a separate access door for giving access to each of said compartments while said drawer is in a horizontal position in said body unit.

4. The carrier of claim 1 and panel means mounted on said drawer to close said drawer when slid into said body and to open to a table position when said drawer is in a vertical position.

5. The carrier of claim 4 and said means for giving access to said drawer comprising a compartment between the front of said drawer and said panel for receiving a camp stove.

* * * * *